(12) United States Patent
Mason et al.

(10) Patent No.: US 11,773,875 B2
(45) Date of Patent: Oct. 3, 2023

(54) CEILING FAN WITH MOUNTING PLATE (71) Applicant: Hunter Fan Company, Memphis, TN (US)

(72) Inventors: Douglas Troy Mason, Horn Lake, MS (US); Matthew McPherson, Memphis, TN (US)

(73) Assignee: Hunter Fan Company, Memphis, TN (US)

( * ) Notice: Subject to any disclaimer, the term of this patent is extended or adjusted under 35 U.S.C. 154(b) by 0 days.

(21) Appl. No.: 18/151,648

(22) Filed: Jan. 9, 2023

(65) Prior Publication Data
US 2023/0160399 A1 May 25, 2023

Related U.S. Application Data (63) Continuation of application No. 16/750,371, filed on Jan. 23, 2020, now Pat. No. 11,578,735.

(51) Int. Cl.
| | |
|---|---|
| *F04D 29/64* | (2006.01) |
| *F04D 25/02* | (2006.01) |
| *F04D 29/043* | (2006.01) |
| *F04D 27/00* | (2006.01) |
| *F04D 25/08* | (2006.01) |
| *F04D 25/06* | (2006.01) |
| *F04D 29/60* | (2006.01) |
| *H02K 7/14* | (2006.01) |
| *F21V 33/00* | (2006.01) |
| *F04D 29/32* | (2006.01) |

(52) U.S. Cl.
CPC ............ *F04D 29/646* (2013.01); *F04D 25/02* (2013.01); *F04D 25/06* (2013.01); *F04D 25/068* (2013.01); *F04D 25/0693* (2013.01); *F04D 25/088* (2013.01); *F04D 27/00* (2013.01); *F04D 29/043* (2013.01); *F04D 29/329* (2013.01); *F04D 29/601* (2013.01); *F21V 33/0096* (2013.01); *H02K 7/14* (2013.01)

(58) Field of Classification Search
CPC ...... F04D 29/646; F04D 25/02; F04D 25/068; F04D 25/0693; F04D 25/088; F04D 27/00; F04D 29/043; F04D 29/329; F04D 29/601; F21V 33/0096; H02K 7/14
See application file for complete search history.

(56) References Cited

U.S. PATENT DOCUMENTS

| | | | |
|---|---|---|---|
| 4,073,598 A | * | 2/1978 | Mizutani ............ F04D 25/0613 416/93 R |
| 4,521,464 A | | 6/1985 | Chapman |
| 4,634,345 A | | 1/1987 | Stanek et al. |
| 4,750,863 A | | 6/1988 | Scoggins |
| 5,007,811 A | | 4/1991 | Hopkins |
| 5,094,676 A | | 3/1992 | Karbacher |
| 5,135,365 A | | 8/1992 | Bogage |

(Continued)

*Primary Examiner* — Peter J Bertheaud
(74) *Attorney, Agent, or Firm* — McGarry Bair PC (57) ABSTRACT

A ceiling fan assembly having a motor with a rotor and a stator, at least one blade operably coupled to the stator, a motor shaft extending from the stator and having an internal wire passage and a wire opening in a side of the motor shaft, with the wire opening providing access to the internal wire passage, a control mounting plate having a motor shaft opening through which the motor shaft extends and an electronic control unit carried by a side of the control mounting plate.

23 Claims, 8 Drawing Sheets

(56) References Cited

U.S. PATENT DOCUMENTS

| | | | |
|---|---|---|---|
| 5,839,881 | A | 11/1998 | Yu |
| 6,398,835 | B1 | 6/2002 | Rehil |
| 8,770,949 | B2 | 7/2014 | Noble |
| 10,069,376 | B2 | 9/2018 | Chiou |
| 10,506,727 | B1 | 12/2019 | Lin |

\* cited by examiner

CEILING FAN WITH MOUNTING PLATE

CROSS-REFERENCE TO RELATED APPLICATION

This application is a continuation application of U.S. patent application Ser. No. 16/750,371, filed Jan. 23, 2020, now allowed, which is hereby incorporated herein by reference in its entirety.

BACKGROUND OF THE INVENTION

Typical ceiling fans are electrically powered, being electrically coupled to a building electrical supply. The ceiling fans include an electric motor that is suspended beneath a ceiling by a hollow downrod through which electrical wires extend from the building electrical supply to the motor. An annular array of fan blades are coupled to the motor such that the blades can rotate about the motor, pushing a flow of air.

Ceiling fans can utilize a mounting plate to support various components located above the motor. The mounting plate can have an opening through which a motor shaft can extend and couple to the downrod. The mounting plate can have an opening, through which the motor shaft extends, with a slot extending radially from the motor shaft that allows the mounting plate to slide down the motor shaft without damaging the wires exiting the motor shaft.

A technical issue with this type of mounting plate is that after assembly of the ceiling fan, the slot creates a pathway for water to reach the motor and other electrical components. Further, the configuration of the mounting plate can inhibit later access to the motor and other electronic components located below the mounting plate in order to repair a ceiling fan not operating properly.

BRIEF DESCRIPTION OF THE INVENTION

In one aspect, the disclosure relates to a ceiling fan assembly comprising a motor having a rotor and a stator, at least one blade operably coupled to the stator, a motor shaft extending from the stator and having an internal wire passage and a wire opening in a side of the motor shaft, with the wire opening providing access to the internal wire passage, a control mounting plate having a motor shaft opening through which the motor shaft extends, with the motor shaft opening being sized to define gap between motor shaft and the control mounting plate, and the control mounting plate is located, relative to the motor shaft, between the wire opening and the rotor and stator, the control mounting plate having opposing first and second sides, with the first side oriented toward the wire opening and the second side oriented toward the rotor and stator, an electronic control unit carried by a first side of the control mount and electrically connected to the motor by wires passing through the wire opening and wire passage, and a multiple segment plug occluding the gap.

DETAILED DESCRIPTION

The present disclosure is directed to a ceiling fan assembly having a multi-segmented mounting plate, which can be assembled in pieces around the motor shaft below the wires instead of sliding over the wiring, negating the need for a slot in the mounting plate for wires. The lack of the slot eliminates a water path to the electrical components. For purposes of illustration, the present disclosure will be described with respect to an exemplary ceiling fan motor housed in an exemplary ceiling fan housing. It will be understood, however, that the disclosure is not so limited and can have general applicability in all ceiling fan or mounting applications, such lighting or suspension for industrial, commercial, and residential applications, as well as a plurality of different ceiling fan designs. It can also have application to ceiling fans comprising multiple motors or angularly oriented motors. Furthermore, the split adapter as described herein will be compatible with all ceiling fan assemblies.

The disclosure is related to a ceiling fan assembly which can be used, for example, in residential and commercial applications. Such applications can be indoors, outdoors, or both. While this description is primarily directed toward a residential ceiling fan, it is also applicable to any environment utilizing fans or for cooling areas utilizing air movement.

As used herein, the term "set" or a "set" of elements can be any number of elements, including only one. All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Figure 1:
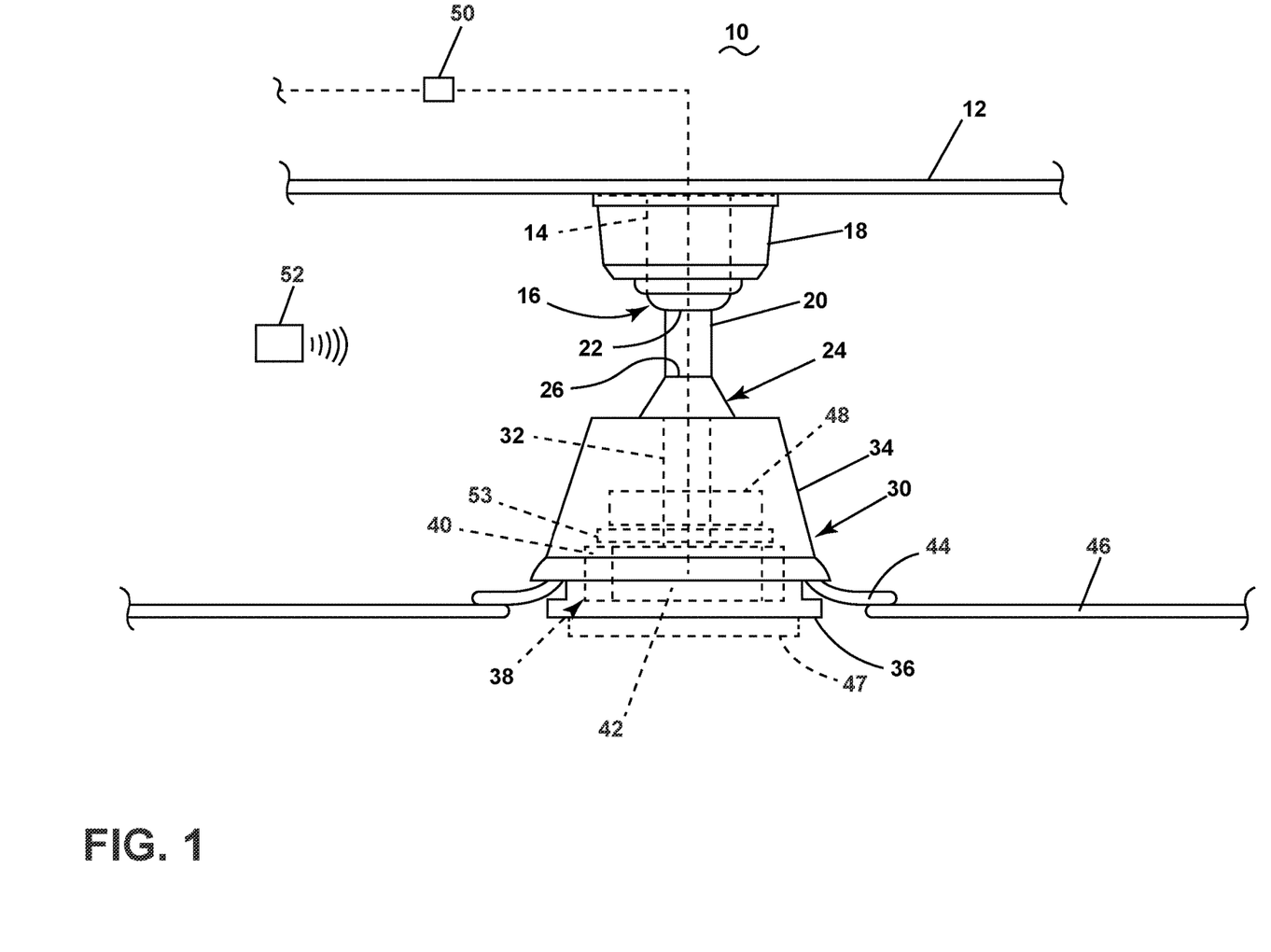
FIG. 1 illustrates a schematic side view of a ceiling fan mounted to a structure and including a mounting assembly according to an aspect of the disclosure.

Referring now to FIG. 1, a ceiling fan 10 is suspended from a structure 12, such as a ceiling of a building. A structure mount 14 secures to the structure 12 and seats a ball mount assembly 16. A canopy 18 encloses the structure mount 14, providing an aesthetically pleasing junction between the ball mount assembly 16 and the structure 12. A downrod 20 couples to the ball mount assembly 16 at a first end 22. A motor adapter assembly 24 couples to the downrod 20 at a second end 26, opposite of the ball mount assembly 16. A motor housing 30 and a motor shaft 32 couple to the motor adapter assembly 24 opposite of the downrod 20. The motor housing 30 can be separated into an upper housing 34 and a lower housing 36, with the upper housing 34 coupling to the motor adapter assembly 24. The motor housing 30 encases a motor 38 having a rotor 40 and a stator 42, with the motor shaft 32 extending from the motor 38 to the motor adapter assembly 24.

A set of blade irons 44 can couple a set of complementary blades 46 to the motor 38. The motor 38 can be electrically powered to rotatably drive the blades 46 to push a volume of air. Optionally, a light kit 47 or switch housing can be provided on the motor housing 30, and is shown positioned at the bottom of the lower housing 36.

A controller 48 can be mounted above the motor 38, and encased in the upper housing 34. The controller 48 can be electrically coupled to an electrical supply 50 to control operation of the ceiling fan 10 and supply power to the motor 38. Alternatively, the controller 48 can be wirelessly or communicatively coupled to the ceiling fan 10, configured to control operation of the ceiling fan 10 remotely, without a dedicated connection. Non-limiting examples of controls for the ceiling fan 10 can include fan speed, fan direction, or light operation. Furthermore, a separate wireless controller 52, alone or in addition to the wired controller 48, can be communicatively coupled to a controller or a wireless receiver in the ceiling fan 10 to control operation of the ceiling fan 10. It is further contemplated in one alternative example that the ceiling fan be operated by the wireless controller 52 alone, and is not operably coupled with the wired controller 48.

In ceiling fans having components mounted directly above the motor 38, a mounting assembly 53 can support such components. By way of non-limiting example, components can include controllers, plates for securing other parts of the ceiling fan 10, portions of the upper housing 34, and other decorative features of ceiling fan 10.

Figure 2:
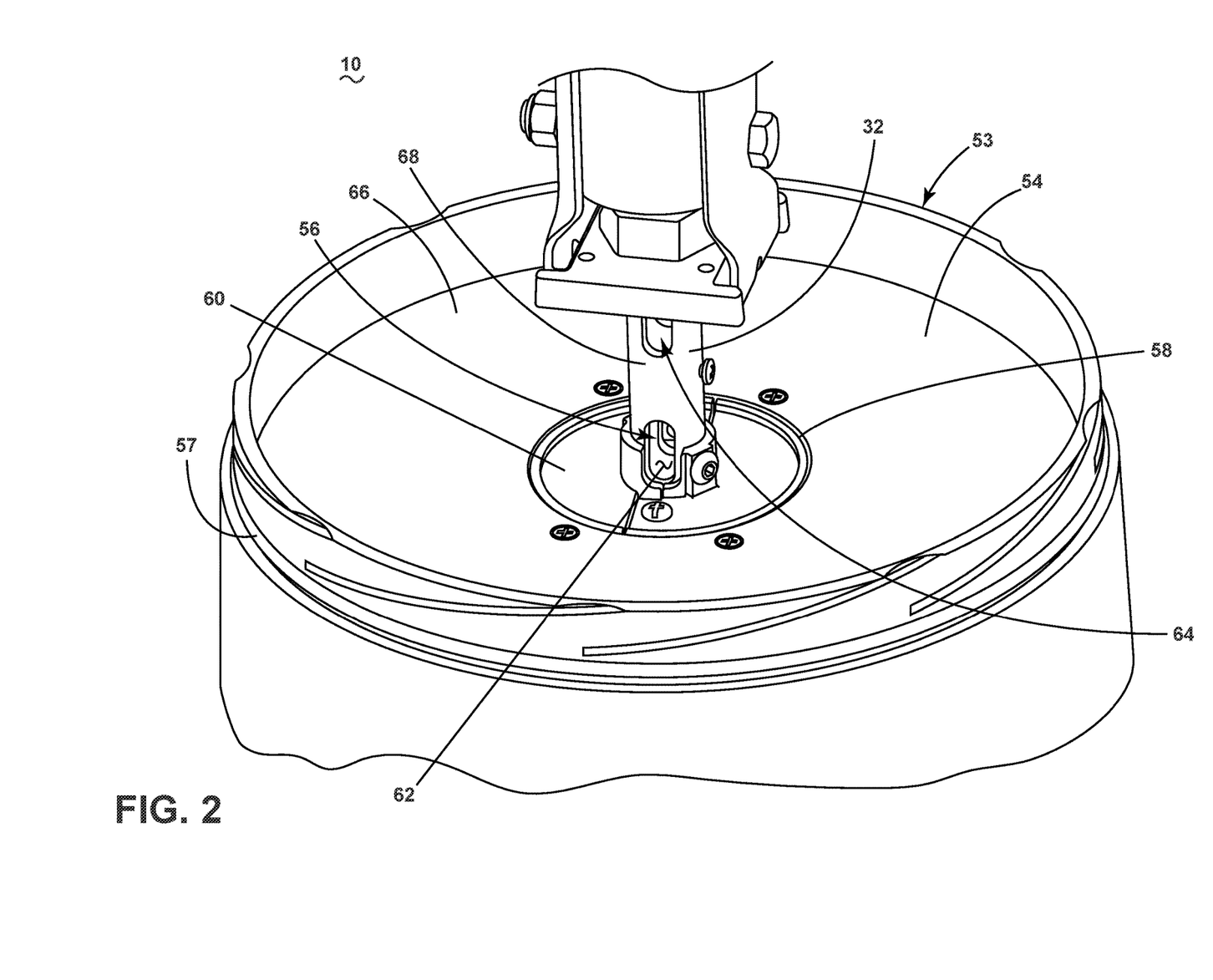
FIG. 2 is a perspective view of a portion of the ceiling fan of FIG. 1 illustrating the mounting assembly including a split adapter according to an aspect of the disclosure.

Turning to FIG. 2, the mounting assembly 53 includes a control mounting plate 54 and a split adapter 60. The control mounting plate 54 forms a platform to support the controller 48 above the motor 38. The control mounting plate 54 includes an upper side 56, a lower side 57 opposite the upper side 56 and facing the motor 38, and a central opening 58 through which the motor shaft 32 extends. A split adapter 60 surrounds the motor shaft 32 and occludes the remainder of the central opening 58 in the control mounting plate 54.

The motor shaft 32 includes an interior 62 through which electrical wiring can pass. An upper wiring hole 64 and a lower wiring hole 66 are formed in the motor shaft 32 allowing electrical wires to pass from the interior 62 of the motor shaft 32 to an exterior side 68 of the motor shaft 32 in order to electrically connect the motor 38, the controller 48, and the electrical supply 50.

Figure 3:
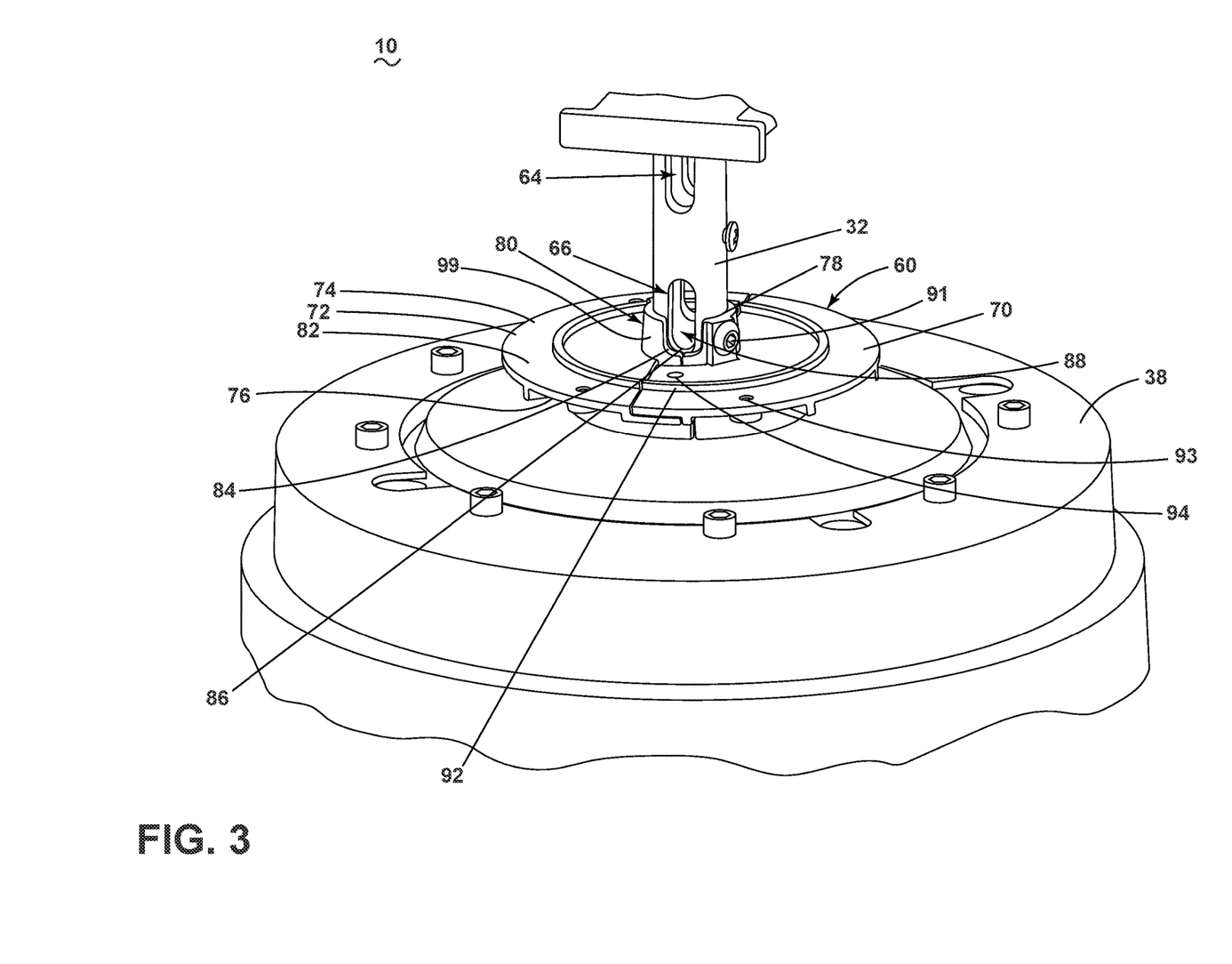
FIG. 3 is a perspective view of the portion of the ceiling fan of FIG. 2 with a portion of the mounting assembly removed according to an aspect of the disclosure.

In FIG. 3, the control mounting plate 54 has been removed for clarity. A first segment 70 and a second segment 72 couple together to form the split adapter 60. The split adapter 60 can include an annular base 82 having an upper surface 74, a lower surface 76 opposite the upper surface 74 and facing the motor 38, and a motor shaft opening 78 through which the motor shaft 32 extends. It is contemplated that any number of segments 70, 72 can be combined to form the split adapter 60. The split adapter 60 can further include a centrally located collar 80 circumscribing the motor shaft 32, defining at least a portion of the motor shaft opening 78, and extending axially from the annular base 82.

The collar 80 can have a cut-out 84 corresponding to a defining edge 86 of the lower wiring hole 66 such that the collar 80 does not block a lower wiring opening 88. The collar 80 can further include one or more apertures 90 (FIG. 5) configured to receive a fastener, such as a bolt 91, to removably fasten the split adapter 60 to the motor shaft 32.

The base 82 includes an indexing rib 92 forming a circular shape, radially spaced from the collar 80, on the upper surface 74. The central opening 58 can receive the indexing rib 92 of the split adapter 60. It is contemplated that the indexing rib 92 can have a peripheral shape complementary to the central opening 58 and the remainder of the upper surface 74 of the split adapter 60 confronts the lower side 57 of the control mounting plate 54.

The base 82 can further include one or more apertures 93 configured to receive a fastener to secure the split adapter 60 to the motor 38, the control mounting plate 54, or both, and one or more apertures 94 configured to receive a fastener to secure the first segment 70 to the second segment 72 to one another. By way of non-limiting example, fasteners can include bolts, screws, pins, or any other fastener capable of securing corresponding elements together.

Figure 4:
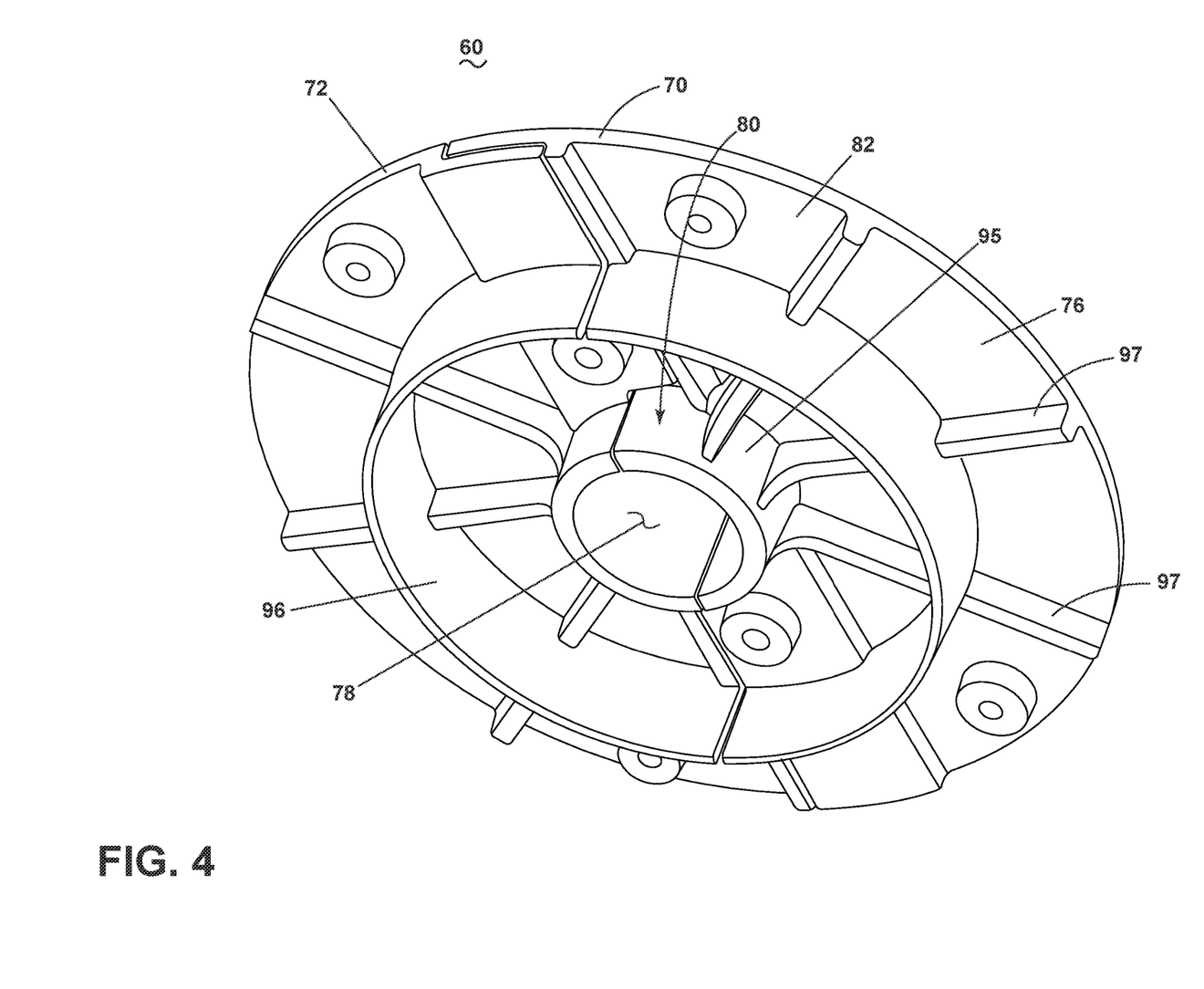
FIG. 4 is a bottom perspective view of the split adapter of FIG. 2 according to an aspect of the disclosure.

FIG. 4 is a perspective bottom view of the split adapter 60. The lower surface 76 of the base 82 can include a lower portion 95 of the collar 80 at least partially defining the motor shaft opening 78. The lower surface 76 can further include one or more circumferential ribs 96, radially spaced from the collar 80. One or more radial ribs 97 extend radially from the collar 80 and can intersect the one or more circumferential ribs 96. The circumferential ribs 96 and the radial ribs 97 together with the indexing rib 92 provide stability and rigidity to the split adapter 60. Further, the circumferential ribs 96 can help prevent water from reaching the motor 38.

Figure 5:
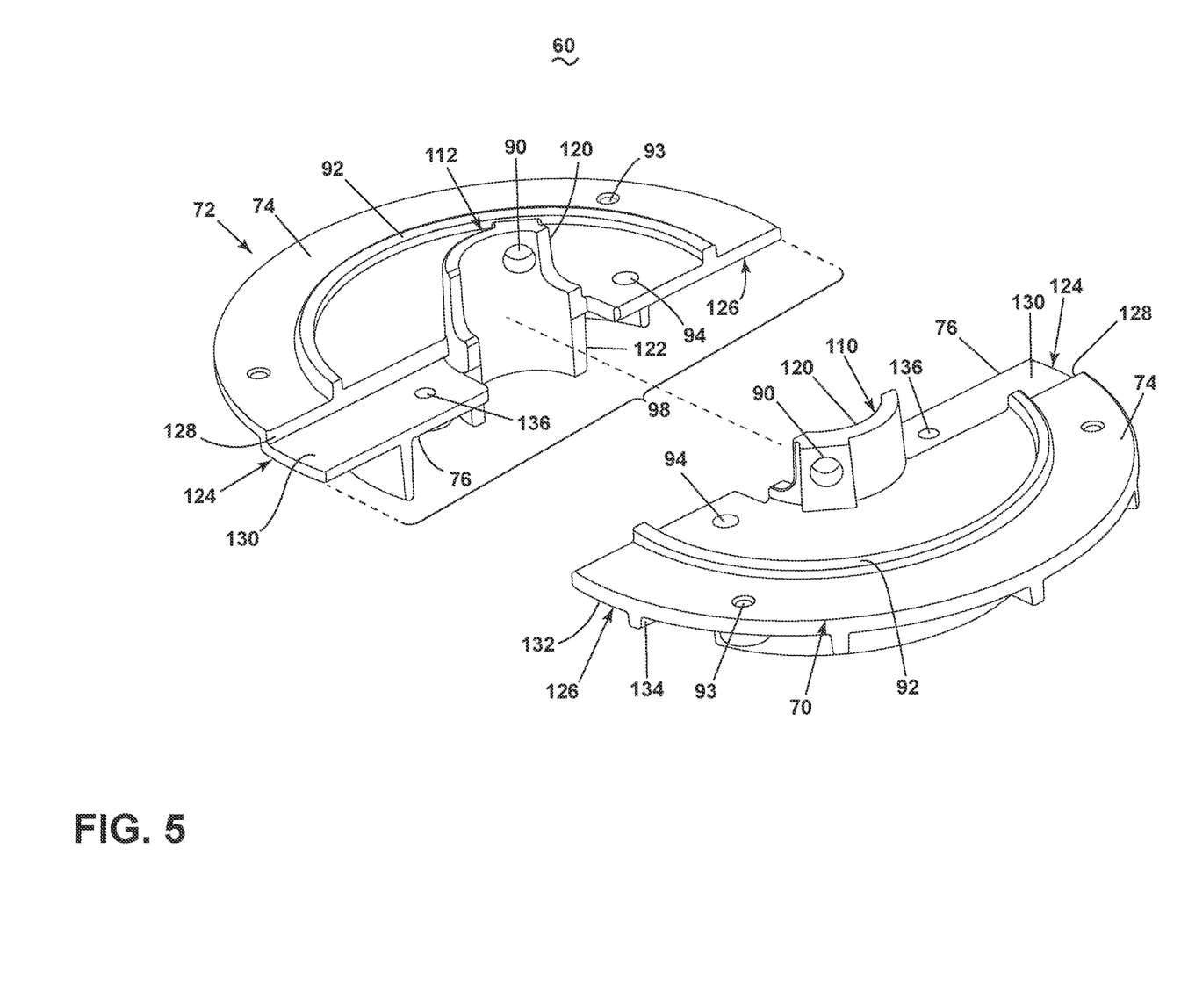
FIG. 5 is an exploded view of the split adapter of FIG. 2 according to an aspect of the disclosure.

FIG. 5 illustrates the split adapter 60 separated into the first segment 70 and the second segment 72. While the first segment 70 and the second segment 72 bisect the split adapter 60 generally in half, along a diameter 98, it is contemplated that any number of segments 70, 72 can be combined to form the split adapter 60. For the purposes of clarity, it is to be understood that the first segment 70 is complementary in shape to the second segment 72. Therefore, only elements of the first segment 70 will be described herein with it being understood that elements of the first segment 70 also apply to the second segment 72 with corresponding numerals for the second segment 72 unless otherwise indicated. A collar member 110 of the first segment 70 and a collar member 112 of the second segment, form the collar 80 when assembled. It is contemplated that each collar member 110, 112 can form at least a portion of the cut-out 84. Alternatively, the cut-out 84 can be formed by only the collar member 110 or the collar member 112. Each collar member 110, 112 includes the aperture 90 to receive a fastener, however it is also contemplated that only collar member 110 or collar member 112 includes the aperture 90. Each collar member 110, 112 further includes an upper end 120 and a lower end 122. Each upper end 120 projects upward from the upper surface 74 of the split adapter 60 forming an upper portion 99 (FIG. 3) of collar 80 when the first and second segments 70, 72 are coupled. Each lower end 122 projects downward from the lower surface 76 to form the lower portion 95 of collar 80 (FIG. 4) when the first and second segments 70, 72 are coupled.

Further, the first and second segments 70, 72 each include an understep 124 and a complementarily shaped overstep 126, opposite the understep 124, configured to overlappingly couple the first and second segments 70, 72. The understep 124 extends radially, from the collar 80. The understep 124 includes a depending riser 128, depending from the upper surface 74, and a tread 130, extending from the depending riser 128 at about a 90 degree angle. Alternatively, the tread 130 can extend from the depending riser 128 at any angle complementary to the overstep 126. A tread portion 132 of the lower surface 76 of the base 82 and a radial riser rib 134 located on the lower surface 76 and complementary in height to the height of the depending riser 128, form the overstep 126. The radial riser rib 134 can optionally be formed by at least a portion of one of the radial ribs 97.

To form the split adapter 60, the first segment 70 couples to the second segment 72 in an overlapping relationship such that the overstep 126 of the first segment 70 overlies the understep 124 of the second segment 72, the overstep 126 of the second segment 72 overlies the understep 124 of the first segment 70, and the indexing rib 92 forms a circle on the upper surface 74 of the base 82. Optionally, each of the understep 124 and the overstep 126 can include the apertures 94 on the overstep 126 and an aperture 136 on the understep 124 are configured to receive a fastener to fasten the first segment 70 to the second segment 72 during assembly of ceiling fan 10. By way of non-limiting example, fasteners can include bolts, screws, pins, or any other fastener capable of securing corresponding elements together.

During assembly of the ceiling fan 10, the split adapter 60 can be assembled around the motor shaft 32, above the motor 38, and below the lower wiring hole 66. Fasteners can secure the split adapter 60 through the apertures 90 to the motor shaft 32 and through the apertures 93, 94 to the motor 38, control mounting plate 54, or both. By way of non-limiting example, can include bolts, screws, pins, or any other fastener capable of securing corresponding elements together. Because the split adapter 60 is assembled in segments 70, 72, in case of a malfunction of the ceiling fan 10, the split adapter 60 can be similarly disassembled post-installation. Disassembling the split adapter 60 creates a large enough central opening in the control mounting plate 54 to enable the control mounting plate 54 to be slid vertically with respect to the motor shaft 32 without damaging or contacting any wiring exiting the interior 62 through the upper and lower wiring holes 64, 66. Removal of the split adapter 60 allows easier access to the motor 38 and wiring than when using a solid, single piece adapter or control mounting plate. The ability to access the motor and wiring allows a malfunctioning ceiling fan to be repaired rather than requiring replacement.

Figure 6:
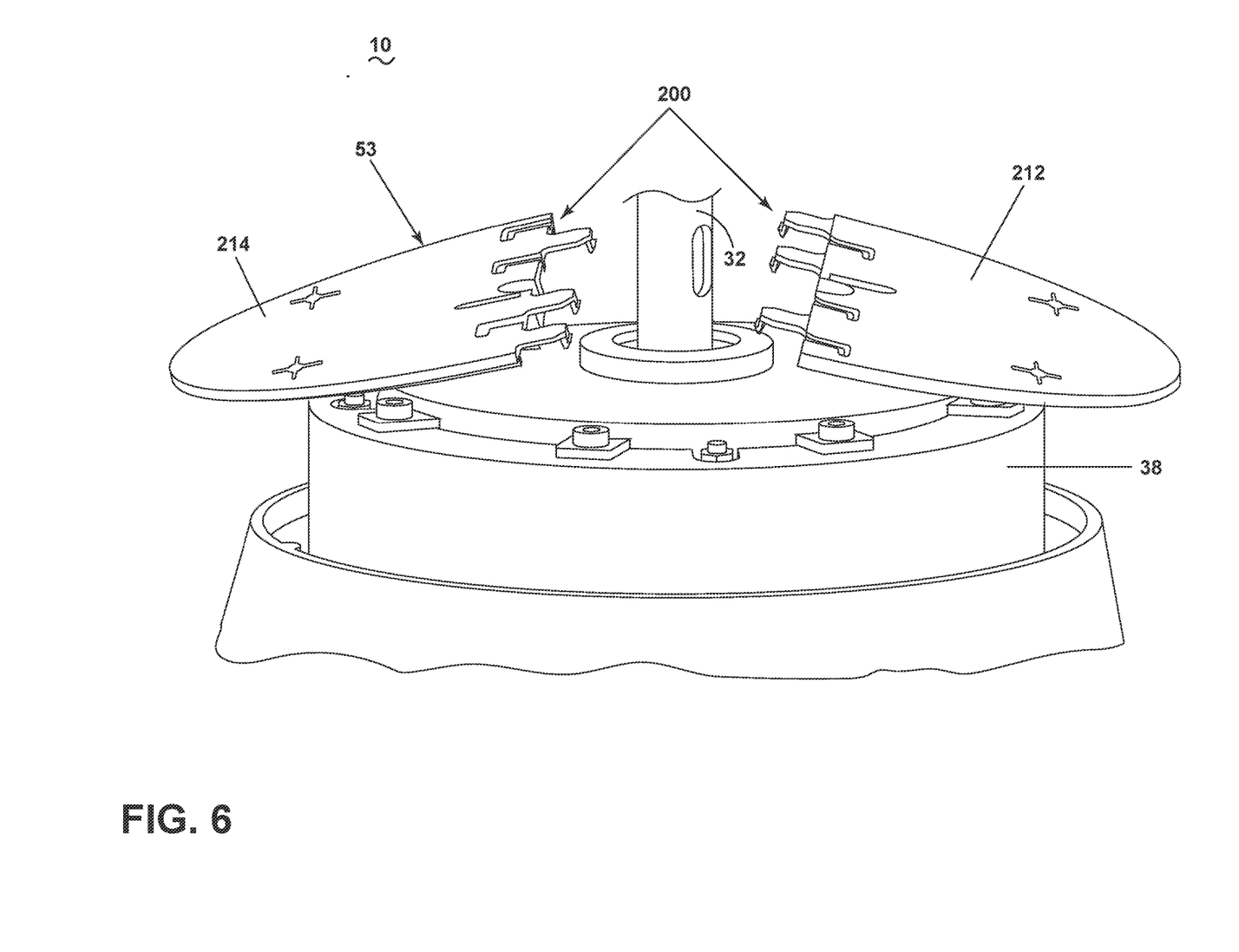
FIG. 6 is a perspective view of a portion of the ceiling fan of FIG. 1 including a mounting assembly in a partially assembled view according to another aspect of the disclosure.

In another aspect of the present disclosure, the mounting assembly 53 can include a single split adapter mounting plate 200. FIG. 6 illustrates partially assembled view of the split adapter mounting plate 200 of a ceiling fan 10. A first segment 212 and a second segment 214 couple together to form the circular-shaped split adapter mounting plate 200. While illustrated as the first segment 212 and the second segment 214 bisect the split adapter mounting plate 200 generally in half, along a diameter 215 (FIG. 7), it is contemplated that any number of segments 212, 214 can be combined to form the split adapter mounting plate 200. By way of non-limiting example, the first segment 212 is a mirror image and complementarily shaped to the second segment 214, therefore, only elements of the first segment 212 will be described herein with it being understood that elements of the first segment 212 also apply to the second segment 214 in mirror image.

Figure 7:
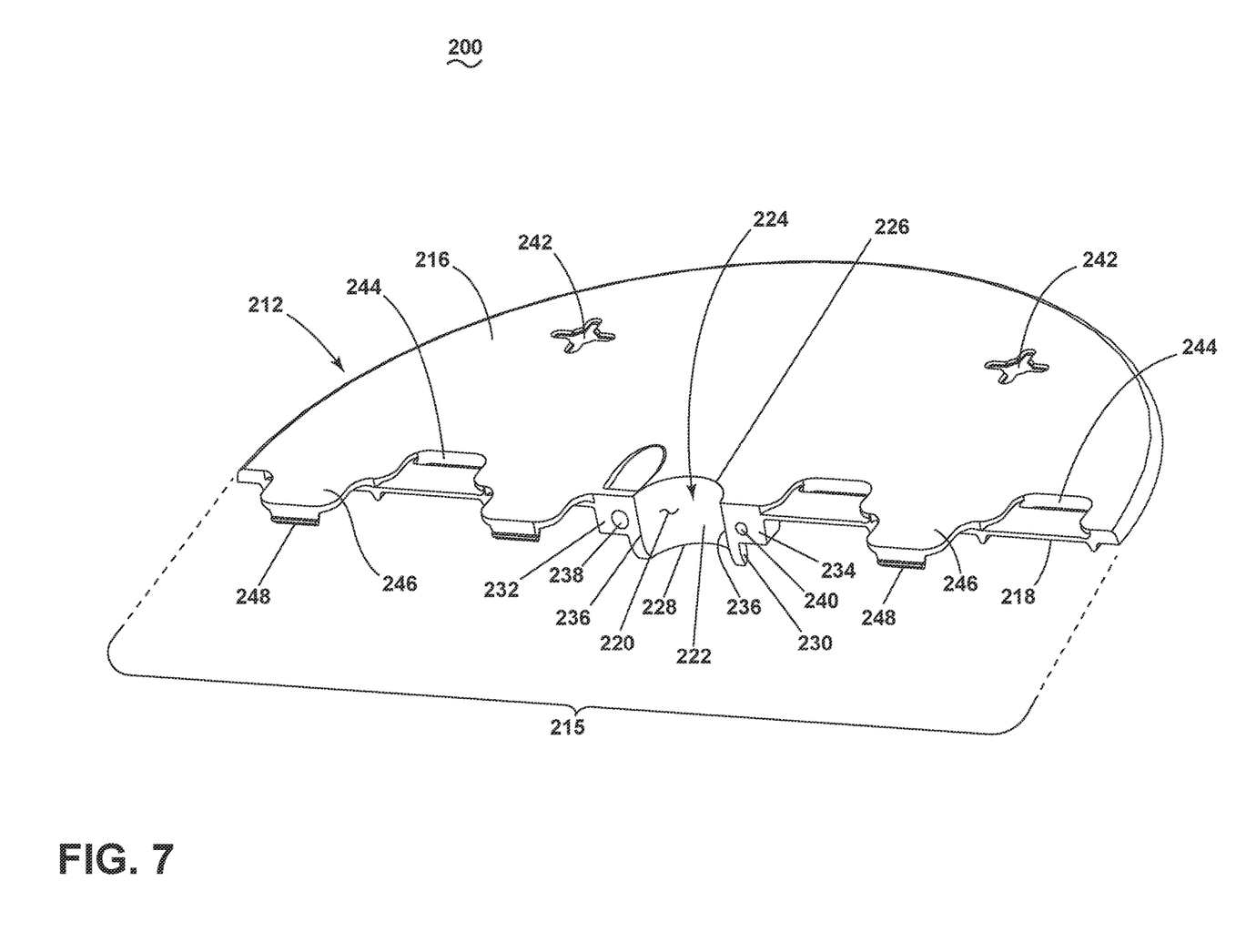
FIG. 7 is a top perspective view of a portion of the mounting assembly of FIG. 6 according to an aspect of the disclosure.

Turning to FIG. 7, the first segment 212 can include a top surface 216, a bottom surface 218 opposite the top surface 216 and confronting the motor 38, and a center channel 220. The center channel 220 can be located at or near the center of the diameter 215 and have a curved interior 222 configured to form a motor shaft opening 224 through which the motor shaft 32 can extend when the first segment 212 is coupled to the second segment 214. The center channel 220 includes an upper edge 226 at the top surface 216 and a lower edge 228 depending from the bottom surface 218. The lower edge 228 of each of the first and second segments 212, 214 can form a lower collar 230 of the motor shaft opening 224.

A first flanged side 232 and a second flange side 234 each flank a portion of and at least partially define the center channel 220 on each of a pair of radial sides 236 of the curved interior 222. A first aperture 238 is formed in the first flange side 232, while a second aperture 240 is formed in the second flange side 234. The first aperture 238 in the first segment 212 is configured to couple with the second aperture 240 in the second segment 214. Likewise, the second aperture in the first segment 212 is configured to couple with the first aperture 238 in the second segment 214. By way of non-limiting example, the first aperture 238 can be a pocket hole formed in the top surface 216 such that a fastener can be driven from the top surface 216, through the first aperture 238 of the first segment 212 and into the second aperture 240 of the second segment 214 to secure the first and second segments 212, 214 to each other during assembly of the split adapter mounting plate 200 around the motor shaft 32. Additionally, the first and second segments 212, 214 can include any number of additional apertures 242 configured to receive fasteners to fasten the split adapter mounting plate 200 to the motor 38.

The first segment 212 further includes one or more tab openings 244 complementarily shaped in order to receive tabs 246 projecting outward from the diameter 215 of the split adapter mounting plate 200. Each tab 246 includes a snap element 248 at a distal end configured to form cooperating snap-fit connections between each tab 246 and each tab opening 244.

Figure 8:
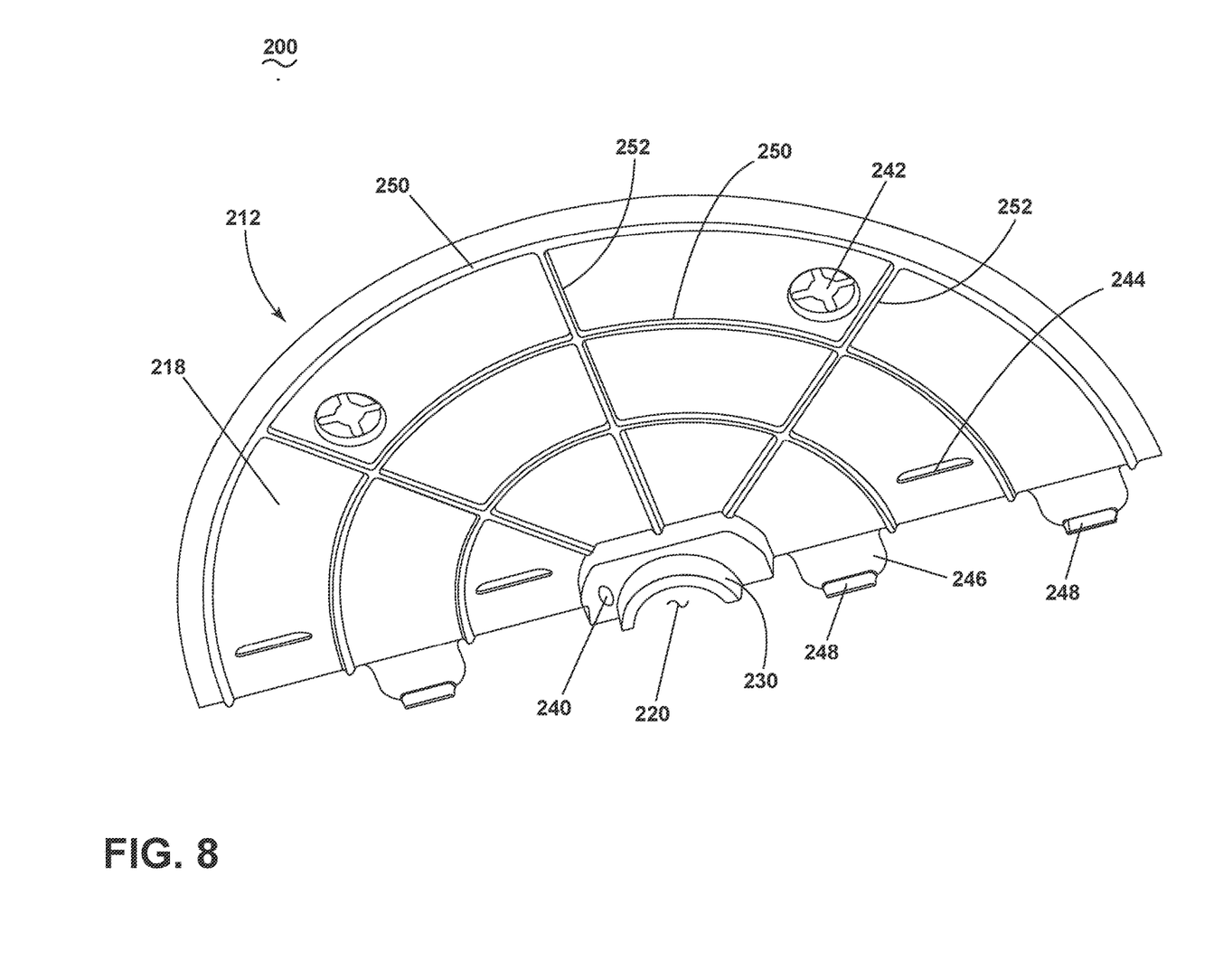
FIG. 8 is a bottom perspective view of the portion of the mounting assembly of FIG. 7 according to an aspect of the disclosure.

FIG. 8 illustrates a bottom perspective view of the first segment 212 of the split adapter mounting plate 200. The bottom surface 218 includes one or more support structures for the split adapter mounting plate 200. One or more circumferential ribs 250, radially spaced from the center channel 220. One or more radial ribs 252 extend from the center channel 220 and can intersect the one or more circumferential ribs 250. The circumferential ribs 250 can be utilized to align the split adapter mounting plate 200 during installation. The circumferential ribs 250 and the radial ribs 252 provide stability and rigidity to the split adapter mounting plate 200. Further, the circumferential ribs 250 can help prevent water from reaching the motor 38.

During assembly of the ceiling fan 10, the split adapter mounting plate 200 can be assembled around the motor shaft 32, above the motor 38, and below the lower wiring hole 66. Fasteners can secure the first and second segments 212, 214 of the split adapter mounting plate 200 through the apertures 238, 240 together and to the motor 38 through apertures 242. By way of non-limiting example, can include bolts, screws, pins, or any other fastener capable of securing corresponding elements together. Because the split adapter mounting plate 200 is assembled in segments 212, 214, in case of a malfunction of the ceiling fan 10, the split adapter mounting plate 200 can be similarly disassembled post-installation. Disassembling the split adapter mounting plate 200 enables access to the electrical elements of the ceiling fan 10 without damaging or contacting any wiring exiting the interior 62 through the upper and lower wiring holes 64, 66. Removal of the split adapter mounting plate 200 allows easier access to the motor 38 and wiring than when using a solid, single piece adapter or mounting plate. The ability to access the motor and wiring allows a malfunctioning ceiling fan to be repaired rather than requiring replacement To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to explain the disclosure, including the best mode, and to enable any person skilled in the art to practice the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A ceiling fan assembly comprising:
a motor housing defining an interior;
a motor having a rotor and a stator, with the stator received within the interior;
at least one blade operably coupled to the motor;
a motor shaft extending from the stator;
a platform located within the interior and having a motor shaft opening through which the motor shaft extends, with the motor shaft opening being sized to define a gap between the motor shaft and the platform, with the platform and gap extending entirely circumferentially around the motor shaft; and
a split adapter located within the interior and having multiple, inter-connected segments, which surround the motor shaft and occlude the gap.

2. The ceiling fan assembly of claim 1 wherein the platform is a single piece.

3. The ceiling fan assembly of claim 1 wherein the motor shaft has a wire opening in a peripheral side of the motor shaft and the platform is located between the wire opening and the motor.

4. The ceiling fan assembly of claim 1 further comprising a controller located between the platform and the motor.

5. The ceiling fan assembly of claim 1 wherein at least one of the multiple, inter-connected segments is mounted to the motor shaft.

6. The ceiling fan assembly of claim 5 wherein all of the multiple, inter-connected segments are mounted to the motor shaft.

7. The ceiling fan assembly of claim 1 wherein at least two of the multiple, inter-connected segments have overlapping portions.

8. The ceiling fan assembly of claim 7 wherein at least one of the overlapping portions is a step.

9. The ceiling fan assembly of claim 8 wherein another of the overlapping portions resides above the step.

10. The ceiling fan assembly of claim 1 wherein at least one of the multiple, inter-connected segments defines at least a portion of a collar circumscribing the motor shaft.

11. The ceiling fan assembly of claim 10 wherein all of the multiple segments have a portion, which collectively defines the collar.

12. The ceiling fan assembly of claim 11 wherein at least one of the multiple, inter-connected segments is co-planar with the platform.

13. The ceiling fan assembly of claim 12 wherein all of the multiple, inter-connected segments are co-planar with the platform.

14. The ceiling fan assembly of claim 11 wherein at least two of the multiple, inter-connected segments have cooperating snap-fit connections.

15. The ceiling fan assembly of claim 14 wherein the snap-fit connections comprise tabs and tab openings, which receive the tabs.

16. The ceiling fan assembly of claim 15 wherein each of the at least two multiple, inter-connected segments has both tabs and tab openings.

17. The ceiling fan assembly of claim 11 wherein the multiple, inter-connected segments comprise two segments.

18. The ceiling fan assembly of claim 17 wherein the two segments collectively define a periphery complementary with the shape of the motor shaft opening.

19. The ceiling fan assembly of claim 18 wherein the periphery is a circle.

20. The ceiling fan assembly of claim 19 wherein the two segments form equal halves of the circle.

21. A ceiling fan assembly comprising:
a motor having a rotor and a stator;
at least one blade operably coupled to the motor;
a motor shaft extending from the stator;
a platform having a motor shaft opening through which the motor shaft extends, with the motor shaft opening being sized to define a gap between the motor shaft and the platform, with the platform and gap extending entirely circumferentially around the motor shaft;
a split adapter having multiple, inter-connected segments, which surround the motor shaft and occlude the gap; and
a controller located between the platform and the motor.

22. A ceiling fan assembly comprising:
a motor having a rotor and a stator;
at least one blade operably coupled to the motor;
a motor shaft extending from the stator;
a platform having a motor shaft opening through which the motor shaft extends, with the motor shaft opening being sized to define a gap between the motor shaft and the platform, with the platform and gap extending entirely circumferentially around the motor shaft;
a split adapter having multiple, inter-connected segments, which surround the motor shaft and occlude the gap; and
wherein at least two of the multiple, inter-connected segments have overlapping portions and at least one of the overlapping portions is a step.

23. A ceiling fan assembly comprising:
a motor having a rotor and a stator;
at least one blade operably coupled to the motor;
a motor shaft extending from the stator;

a platform having a motor shaft opening through which the motor shaft extends, with the motor shaft opening being sized to define a gap between the motor shaft and the platform, with the platform and gap extending entirely circumferentially around the motor shaft;

a split adapter having multiple, inter-connected segments, which surround the motor shaft and occlude the gap; and wherein at least one of the multiple, inter-connected segments defines at least a portion of a collar circumscribing the motor shaft and all of the multiple segments have a portion, which collectively defines the collar.

\* \* \* \* \*